(12) United States Patent
Verbridge

(10) Patent No.: US 10,703,192 B2
(45) Date of Patent: Jul. 7, 2020

(54) VEHICLE DRIVELINE WITH ARTICULATING WHEEL MOTORS

(71) Applicant: RIVIAN IP HOLDINGS, LLC, Plymouth, MI (US)

(72) Inventor: Mason Verbridge, Livonia, MI (US)

(73) Assignee: RIVIAN IP HOLDINGS, LLC, Plymouth, MI (US)

( * ) Notice: Subject to any disclaimer, the term of this patent is extended or adjusted under 35 U.S.C. 154(b) by 0 days.

(21) Appl. No.: 16/005,448

(22) Filed: Jun. 11, 2018

(65) Prior Publication Data
US 2019/0375287 A1 Dec. 12, 2019

(51) Int. Cl.
*B60K 7/00* (2006.01)

(52) U.S. Cl.
CPC .... *B60K 7/0007* (2013.01); *B60K 2007/0053* (2013.01); *B60K 2007/0092* (2013.01)

(58) Field of Classification Search
CPC ............... B60K 7/0007; B60K 2007/0053
See application file for complete search history.

(56) References Cited

U.S. PATENT DOCUMENTS

| | | | |
|---|---|---|---|
| 5,004,061 A | 4/1991 | Andruet | |
| 5,829,542 A * | 11/1998 | Lutz | B60K 1/02 180/65.6 |
| 7,243,749 B2 * | 7/2007 | Kakinami | B60K 7/00 180/65.51 |
| 9,302,707 B2 | 4/2016 | Buschjohann et al. | |
| 9,731,572 B2 * | 8/2017 | Tamura | B60K 7/0007 |
| 2004/0094928 A1 * | 5/2004 | Amanuma | B60G 3/20 280/124.125 |
| 2004/0222030 A1 | 11/2004 | Szalony et al. | |
| 2006/0180365 A1 | 8/2006 | Innami et al. | |
| 2006/0225931 A1 * | 10/2006 | Kurata | B60K 7/0007 180/65.51 |
| 2008/0303234 A1 * | 12/2008 | McCann | B60G 3/06 280/93.511 |
| 2009/0133944 A1 * | 5/2009 | Nishioka | B60G 3/20 180/65.51 |

(Continued)

FOREIGN PATENT DOCUMENTS

| | | |
|---|---|---|
| DE | 102011083197 | 3/2013 |
| DE | 102015205817 | 9/2016 |
| DE | 102015226589 | 6/2017 |

OTHER PUBLICATIONS

International Search Report for International Application PCT/US2019/036454, dated Nov. 21, 2019.

*Primary Examiner* — Brian L Swenson
(74) *Attorney, Agent, or Firm* — Clements Bernard Walker; Robert R. Richardson; Christopher L. Bernard

(57) ABSTRACT

A driveline for a vehicle includes a frame member, a knuckle, a control arm, a hub, an electric motor, and an axle member. The control arm couples the knuckle to the frame member. The hub is coupled to the knuckle and adapted to support a drive wheel for rotation about a wheel axis relative to the knuckle. The electric motor includes a rotor rotatable about a motor output axis. The motor is supported so that an orientation of the motor output axis relative to the knuckle and the frame member changes when an orientation of the control arm relative to the frame member changes. The axle member couples the rotor to the hub for torque transmission therebetween.

20 Claims, 5 Drawing Sheets

(56) References Cited

U.S. PATENT DOCUMENTS

| | | | |
|---|---|---|---|
| 2010/0108417 A1* | 5/2010 | Gilmore | B60K 6/448 180/65.51 |
| 2015/0367720 A1* | 12/2015 | Yukishima | B60K 7/0007 180/60 |
| 2015/0375613 A1* | 12/2015 | Koval | B60K 7/0007 180/242 |
| 2019/0100095 A1* | 4/2019 | Ziech | B60K 7/0007 |

* cited by examiner

VEHICLE DRIVELINE WITH ARTICULATING WHEEL MOTORS

FIELD

The present disclosure relates generally to a vehicle driveline and more specifically to a vehicle driveline with articulating wheel motors.

BACKGROUND

The statements in this section merely provide background information related to the present disclosure and may not constitute prior art.

Electric drive units typically include an electric motor rigidly mounted to the frame at a location that is generally located between two drive wheels. A half shaft typically couples the output shaft of the motor to a drive wheel that can propel the vehicle. However, the drive unit takes up packaging space on the vehicle and the size of the motors within the drive unit typically requires the drive unit to have a width that reduces the length of the half shafts. Shortened half shafts can reduce overall wheel travel due, in part, to angular limitations of constant velocity joints ("CV joints").

Other electric vehicles include drive motors mounted concentrically within the wheel for movement with the wheel. This configuration eliminates the need for the half shafts. However, electric motors are typically relatively heavy compared to the wheel and this configuration adds considerable amount of weight to the unsprung mass of the vehicle, which can be detrimental to certain vehicle dynamics.

Accordingly, these issues with suspension travel and unsprung weight are addressed by the driveline of the present disclosure.

SUMMARY

In one form, a driveline for a vehicle includes a frame member, a knuckle, a control arm, a hub, an electric motor, and an axle member. The control arm couples the knuckle to the frame member. The hub is coupled to the knuckle and adapted to support a drive wheel for rotation about a wheel axis relative to the knuckle. The electric motor includes a rotor rotatable about a motor output axis. The motor is supported so that an orientation of the motor output axis relative to the knuckle and the frame member changes when an orientation of the control arm relative to the frame member changes. The axle member couples the rotor to the hub for torque transmission therebetween.

According to a further form, the driveline further includes a steering member. The steering member is coupled to the knuckle and configured to adjust a steering angle of the knuckle.

According to a further form, the driveline further includes a first constant velocity joint that couples the axle member to the hub.

According to a further form, the driveline further includes a second constant velocity joint that couples the axle member to the rotor of the motor.

According to a further form, the motor is mounted to the frame member.

According to a further form, the driveline further includes a link member. The link member includes a first end coupled to the control arm and a second end coupled to the motor. The link member is configured to move the motor relative to the frame member based on a position of the control arm.

According to a further form, the driveline further includes a plurality of bushings that support the motor relative to the frame member and have compliance that permits articulation of the motor across an angular range relative to the frame member.

According to a further form, the motor is mounted to control arm.

According to a further form, the driveline further includes a plurality of bushings that support the motor relative to the control arm and have compliance that permits articulation of the motor across an angular range relative to the frame member.

According to a further form, the motor is mounted to the control arm at a location along the control arm that is closer to the frame member than the knuckle.

In another form, a driveline for a vehicle includes a frame member, a knuckle, a control arm, a hub, an electric motor, and an axle member. The control arm couples the knuckle to the frame member. The hub is coupled to the knuckle and adapted to support a drive wheel for rotation about a wheel axis relative to the knuckle. The electric motor includes a rotor rotatable about a motor output axis. The motor is mounted to the frame member and movable relative to the frame member between a first motor position wherein the motor output axis and the wheel axis form a first angle, and a second motor position wherein the motor output axis and the wheel axis form a second angle different than the first angle. The axle member couples the rotor to the hub for torque transmission therebetween.

According to a further form, the driveline further includes a steering member. The steering member is coupled to the knuckle and configured to adjust a steering angle of the knuckle.

According to a further form, the driveline further includes at least one constant velocity joint. The at least one constant velocity joint couples the axle member to one of the hub and the rotor of the motor.

According to a further form, the driveline further includes a link member. The link member includes a first end coupled to the control arm and a second end coupled to the motor. The link member is configured to move the motor between the first and second motor positions based on a position of the control arm.

According to a further form, the driveline further includes a plurality of bushings that support the motor relative to the frame member.

In another form, a driveline for a vehicle includes a frame member, a knuckle, a control arm, a hub, an electric motor, and an axle member. The control arm couples the knuckle to the frame member. The hub is coupled to the knuckle and adapted to support a drive wheel for rotation about a wheel axis relative to the knuckle. The electric motor includes a rotor rotatable about a motor output axis. The motor is mounted to the control arm and movable relative to the frame member between a first motor position wherein the motor output axis and the wheel axis form a first angle, and a second motor position wherein the motor output axis and the wheel axis form a second angle different than the first angle. The axle member couples the rotor to the hub for torque transmission therebetween.

According to a further form, the driveline further includes a plurality of bushings that support the motor relative to the control arm and have compliance that permits articulation of the motor across an angular range relative to the control arm.

According to a further form, the motor is mounted to the control arm at a location along the control arm that is closer to the frame member than the knuckle.

According to a further form, the driveline further includes a steering member. The steering member is coupled to the knuckle and configured to adjust a steering angle of the knuckle.

According to a further form, the driveline further includes at least one constant velocity joint. The at least one constant velocity joint couples the axle member to one of the hub and the rotor of the motor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
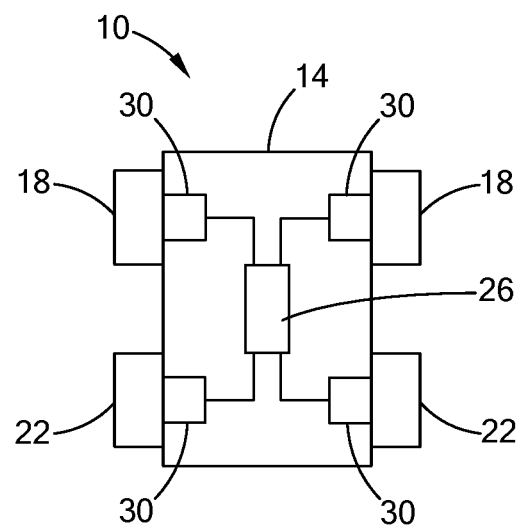
FIG. 1 is a schematic top down view of an example vehicle in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is schematically illustrated and includes a vehicle frame 14, a plurality of vehicle wheels 18, 22, a power source 26, and a distributed driveline system that includes a plurality of drivelines 30. In the example provided, the vehicle 10 has four wheels, with two front wheels 18 and two rear wheels 22, though other configurations can be used. For example, the vehicle 10 can be configured with three wheels or with more than four wheels. In the example provided, all four wheels 18, 22 are driven wheels that are connected to a corresponding one of the drivelines 30 to receive rotary power therefrom, though other configurations can be used such as front wheel drive or rear wheel drive configurations. The drivelines 30 are electric drivelines connected to the power source 26 to receive electric power therefrom. The power source 26 is any suitable type of electric power source or storage device, such one or more batteries, capacitors, supercapacitors and/or an electric power generator.

Figure 2:
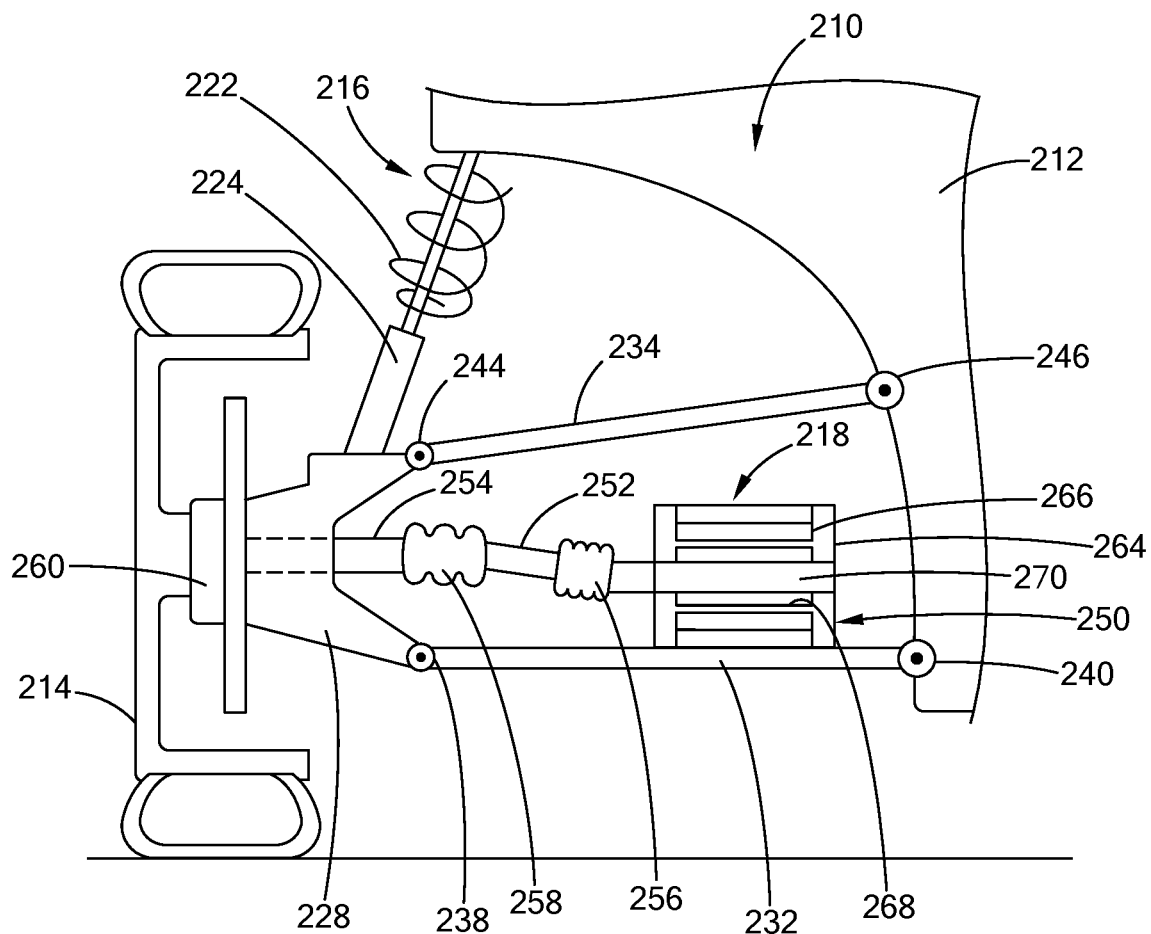
FIG. 2 is a partial sectional view of a portion of the vehicle of FIG. 1, illustrating a driveline of the vehicle in a first position.
Figure 3:
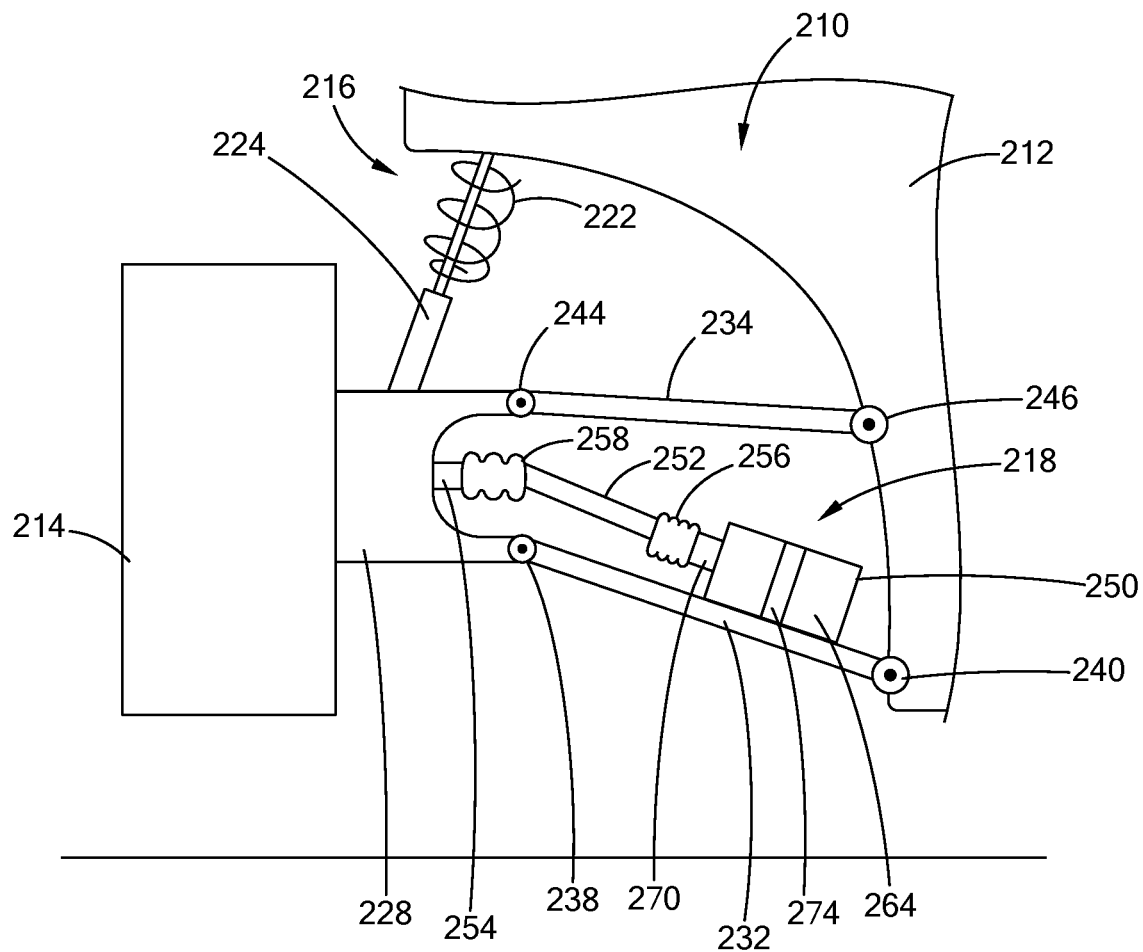
FIG. 3 is a front view similar to FIG. 2, illustrating the driveline in a second position.

With additional reference to FIGS. 2 and 3, a portion of a vehicle 210 is illustrated including a vehicle frame 212, a vehicle drive wheel 214, a suspension system 216, and a driveline 218. The vehicle 210 can be configured similar to the vehicle 10 (FIG. 1) and the vehicle wheel 214 can correspond to the front wheels 18 (FIG. 1) and/or the rear wheels 22 (FIG. 1), while the driveline 218 corresponds to the associated driveline 30 (FIG. 1). While not specifically shown, the vehicle 210 can also include a steering system configured to steer the wheel 214, such as when drive wheel 214 corresponds to one of the front wheels 18 (FIG. 1) of the vehicle 10 (FIG. 1).

The frame 212 can be any suitable type of frame member. For example, the frame 212 can be a vehicle frame of a frame-on-body type vehicle, or a structural frame portion of a uni-body type vehicle, or a subframe of a monocoque type vehicle. While illustrated as a single member for simplicity, the frame 212 can include multiple pieces that are rigidly coupled together. In one configuration, the frame 212 is a subframe that can be pre-assembled with the suspension system 216 and driveline 218 as a complete, modular drive assembly that can then be mounted and removed from the rest of the vehicle frame as a whole driveline system.

The suspension system 216 includes a spring 222, a damper 224, a wheel knuckle 228, a lower control arm 232 and an upper control arm 234. While not specifically shown, the suspension system 216 can include additional control arm members. In the example provided, the spring 222 and damper 224 are in the form of a strut assembly, though other configurations can be used, such as the spring 222 and damper 224 being separately mounted. The damper 224 has one end mounted to the wheel knuckle 228 and another end mounted to the frame 212 and is configured to dampen oscillations of the wheel 214 relative to the frame 212. In an alternative configuration, not specifically shown, the damper 224 can be mounted between the frame 212 and another movable portion of the suspension system 216, such as one of the control arms 232, 234. In the example provided, the spring 222 is mounted between the frame 212 and the portion of the damper 224 that is mounted to the knuckle 228.

The lower control arm 232 is a rigid member with an outboard end 238 attached to the wheel knuckle 228 and an inboard end 240 attached to the frame 212. The upper control arm 234 is a rigid member with an outboard end 244 attached to the wheel knuckle 228 and an inboard end 246 attached to the frame 212. In the example provided, the outboard end 244 of the upper control arm 234 is attached to the knuckle 228 at a location on the knuckle 228 that is generally above the connection of the lower control arm 232 to the knuckle 228 and the inboard end 246 of the upper control arm 234 is attached to the frame 212 at a location on the frame 212 that is generally above the connection of the lower control arm 232 to the frame 212.

The lower and upper control arms 232, 234 are attached to the knuckle 228 and the frame 212 in a manner that permits the knuckle 228 to move generally up and down relative to the frame 212 (e.g., pivot between the position shown in FIG. 2 and the position shown in FIG. 3). For example, the lower and upper control arms 232, 234 can be mounted to the knuckle 228 and the frame 212 by pivot joints or ball joints. When used on a steerable wheel, the connections between the lower control arm 232 and the knuckle 228 and the upper control arm 234 and the knuckle 228 can be configured to allow the knuckle 228 to rotate through the wheel's steering angle, such as with a ball joint for example.

The driveline 218 includes an electric motor 250, an inboard axle member 252, an outboard axle member 254, a first constant velocity ("CV") joint 256, a second CV joint 258, and a wheel hub 260. The electric motor 250 can be any suitable type of electric motor configured to receive electrical power from the power source 26 (FIG. 1) via power cables (not shown) and output rotary power. In the example provided, the electric motor 250 includes a housing 264, a stator 266, a rotor 268, and an output shaft 270. The housing 264 is fixedly coupled to the lower control arm 232 for movement with the lower control arm 232 relative to the frame 212. In the example provided, the motor 250 is mounted to the lower control arm 232 at a location along the lower control arm 232 such that the center of mass of the motor 250 is closer to the inboard end 240 than the outboard end 238. Thus, the majority of the weight of the motor 250 is considered sprung mass. In the example provided, the housing 264 is mounted to the lower control arm by a bracket 274 (shown in FIG. 3).

The stator 266 is disposed within the housing 264 and fixedly coupled to the housing 264. The rotor 268 is disposed within the housing 264 and rotatable relative to the housing 264 and the stator 266. The output shaft 270 is fixedly coupled to the rotor 268 for common rotation about an output axis of the motor 250. In the example provided, the output shaft 270 extends axially outward from the housing 264 and is coupled to an inboard side of the first CV joint 256 for common rotation therewith. In an alternative configuration, not shown, the output shaft 270 is coupled to a reduction gearset and an output of the reduction gearset is coupled to the inboard side of the first CV joint 256 for common rotation. The reduction gearset (not shown) can be disposed within the housing 264.

Returning to the example provided, the inboard axle member 252 has one end coupled to the outboard side of the first CV joint 256 and another end coupled to the inboard side of the second CV joint 258. The second CV joint 258 is outboard of the first CV joint 256. The outboard axle member 254 has one end coupled to the outboard side of the second CV joint 258 and another end coupled to the wheel hub 260 for common rotation about the rotational axis of the wheel 214. In the example provided, the outboard axle member 254 extends through the wheel knuckle 228 and is rotatable relative to the knuckle 228.

The wheel hub 260 is outboard of the wheel knuckle 228 and coupled to the knuckle 228 for rotation relative thereto. The wheel hub 260 is mounted to the wheel 214 for common rotation about the rotational axis of the wheel 214.

Thus, the output axis of the motor 250 can be different from the rotational axes of the inboard and outboard axle members 252, 254 and the rotational axis of the wheel 214. Additionally, when the wheel 214 travels over uneven terrain or otherwise moves up and down relative to the frame 212 (e.g., as in the change of position shown from FIG. 2 to FIG. 3), the angle between the motor output axis and the wheel rotational axis can change, and the angle between the motor output axis and the frame 212 can change. In the example provided, the angle between the motor output axis and the lower control arm 232 remains constant. In an alternative configuration, not shown, the motor 250 can be mounted to the upper control arm 234 instead of the lower control arm 232.

Figure 4:
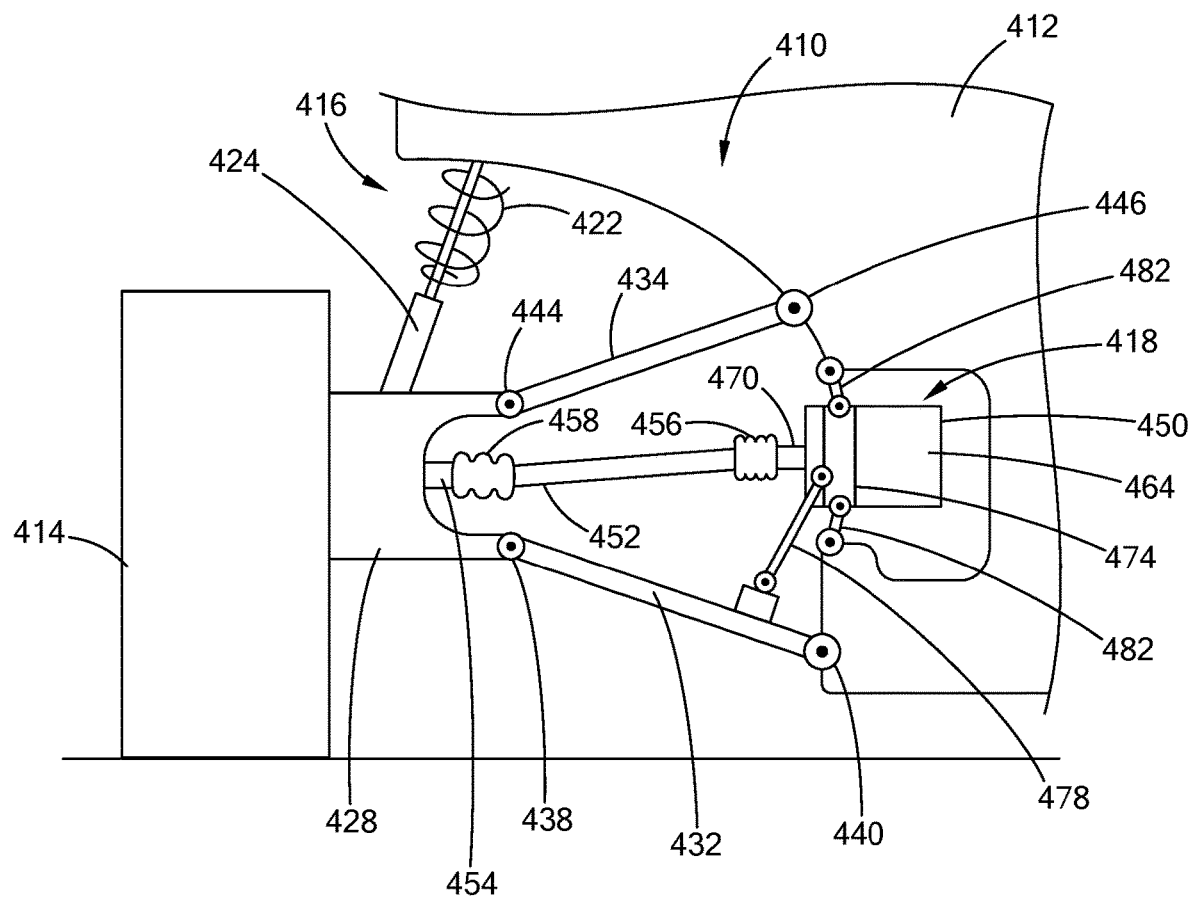
FIG. 4 is front view of a portion of a vehicle in accordance with the teachings of the present disclosure, illustrating a driveline of a second configuration.

With additional reference to FIG. 4, a portion of a vehicle 410 is illustrated including a vehicle frame 412, a vehicle drive wheel 414, a suspension system 416, and a driveline 418. The vehicle 410 can be configured similar to the vehicle 10 (FIG. 1) and the vehicle 210 (FIGS. 2 and 3) and the vehicle wheel 414 can correspond to the front wheels 18 (FIG. 1) and/or the rear wheels 22 (FIG. 1), while the driveline 418 corresponds to the associated driveline 30 (FIG. 1). While not specifically shown, the vehicle 410 can also include a steering system configured to steer the wheel 414, such as when drive wheel 414 corresponds to one of the front wheels 18 (FIG. 1) of the vehicle 10 (FIG. 1). The frame 412, drive wheel 414, suspension system 416, and driveline 418 can be similar to the frame 212, wheel 214, suspension system 216, and driveline 218 of FIGS. 2 and 3, except as otherwise shown or described herein. Accordingly, only differences are described in detail herein.

The suspension system 416 includes a spring 422, a damper 424, a wheel knuckle 428, a lower control arm 432 and an upper control arm 434, which can be similar to the suspension system 216 (FIGS. 2 and 3) except as otherwise shown or described herein. While not specifically shown, the suspension system 416 can similarly include additional control arm members.

The lower control arm 432 is a rigid member similar to the lower control arm 232 (FIGS. 2 and 3) with an outboard end 438 attached to the wheel knuckle 428 and an inboard end 440 attached to the frame 412. The upper control arm 434 is a rigid member similar to the upper control arm 234 (FIGS. 2 and 3) with an outboard end 444 attached to the wheel knuckle 428 and an inboard end 446 attached to the frame 412. Similar to the lower and upper control arms 232, 234 (FIGS. 2 and 3), the lower and upper control arms 432, 434 are attached to the knuckle 428 and the frame 412 in a manner that permits the knuckle 428 to move generally up and down relative to the frame 412 and can allow steering of the wheel 414 if the wheel 414 is a steerable wheel.

The driveline 418 includes an electric motor 450, an inboard axle member 452, an outboard axle member 454, a first CV joint 456, a second CV joint 458, and a wheel hub (not shown) that can be similar to the driveline 218 (FIGS. 2 and 3) except as otherwise shown or described herein. Additionally, the driveline 418 includes a motor bracket 474 and a positioning member 478. Similar to the motor 250 (FIGS. 2 and 3), the electric motor 450 includes a housing 464, a stator (not shown), a rotor (not shown), and an output shaft 470. The motor bracket 474 couples the housing 464 to the frame 412 for movement relative to the frame 412.

In the example provided, the bracket 474 includes a plurality of mount members 482. The mount members 482 attach the housing 464 to the frame 412 so that the weight of the motor 450 is supported entirely by the frame 412. Thus, the entire weight of the motor 450 is considered sprung mass. The mount members 482 are coupled to the frame 412 to permit the motor 450 to pivot relative to the frame 412, such as with pivot joints, ball joints, or compliant bushings. While two mount members 482 are illustrated, with one mounted to the top of the housing 464 and the other mounted to the bottom of the housing 464, different configurations or numbers of mount members 482 can be used. In the example provided, each mount member 482 has one end attached to the housing 464 and the other end attached to the frame 412. Each mount member can be a generally rigid body and can be mounted to the housing 464 and the frame 412 with compliant bushings.

The positioning member 478 couples the bracket 474 to the lower control arm 432 in a manner that changes the angle of the motor output axis relative to the frame 412 based on the position of the lower control arm 432 relative to the frame 412. In the example provided, the positioning member 478 is a generally rigid body with one end mounted to the lower control arm 432 and the other end mounted to the bracket 474. In an alternative configuration, not specifically shown, the positioning member 478 can have one end mounted to the upper control arm 434 and the other end mounted to the bracket 474.

Figure 5:
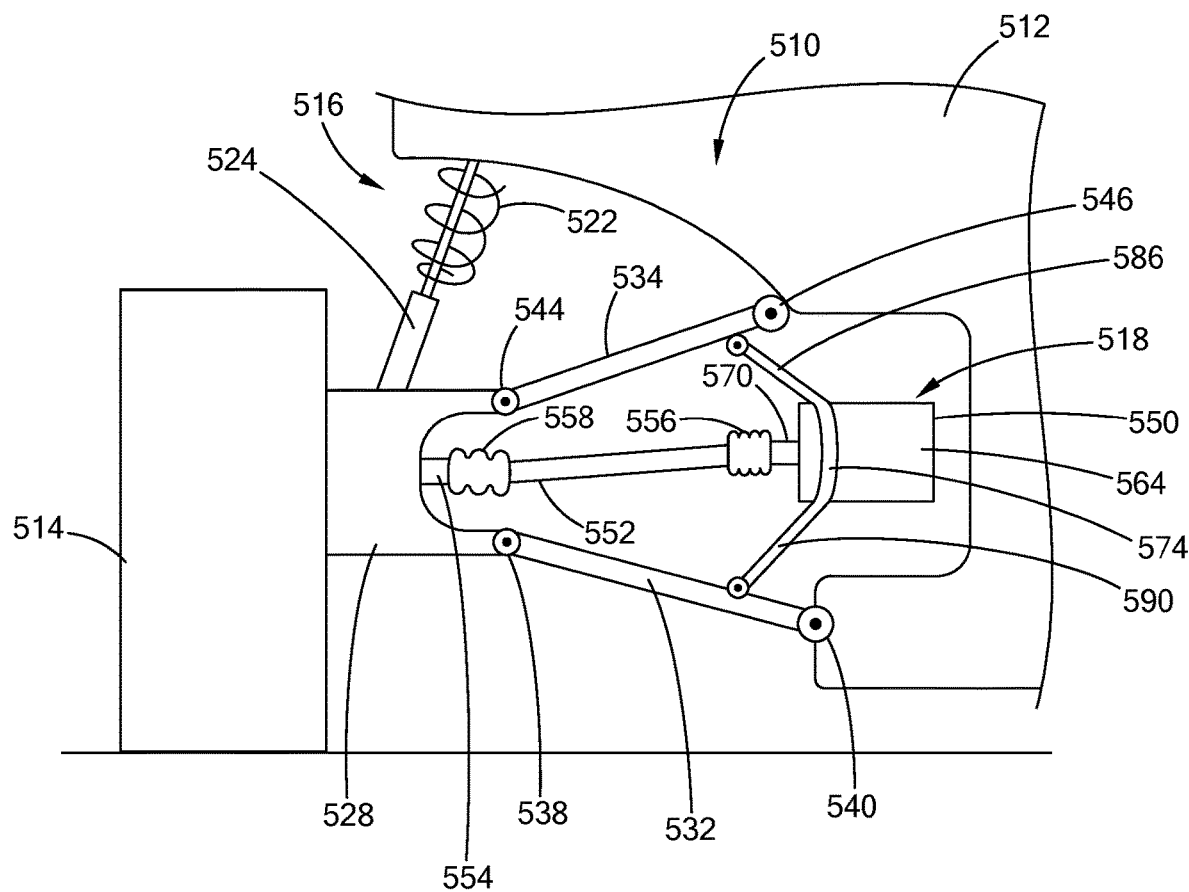
FIG. 5 is front view of a portion of a vehicle in accordance with the teachings of the present disclosure, illustrating a driveline of a third configuration.

With additional reference to FIG. 5, a portion of a vehicle 510 is illustrated including a vehicle frame 512, a vehicle drive wheel 514, a suspension system 516, and a driveline 518. The vehicle 510 can be configured similar to the vehicle 10 (FIG. 1), the vehicle 210 (FIGS. 2 and 3), and the vehicle 410 (FIG. 4), and the vehicle wheel 514 can correspond to the front wheels 18 (FIG. 1) and/or the rear wheels 22 (FIG. 1), while the driveline 518 corresponds to the associated driveline 30 (FIG. 1). While not specifically shown, the vehicle 510 can also include a steering system configured to steer the wheel 514, such as when drive wheel 514 corresponds to one of the front wheels 18 (FIG. 1) of the vehicle 10 (FIG. 1). The frame 512, drive wheel 514, suspension system 516, and driveline 518 can be similar to the frame 212, 412, wheel 214, 414, suspension system 216, 416, and driveline 218, 418 of FIGS. 2-4, except as otherwise shown or described herein. Accordingly, only differences are described in detail herein.

The suspension system 516 includes a spring 522, a damper 524, a wheel knuckle 528, a lower control arm 532 and an upper control arm 534, which can be similar to the suspension systems 216, 416 (FIGS. 2-4) except as otherwise shown or described herein. While not specifically shown, the suspension system 516 can similarly include additional control arm members.

The lower control arm 532 is a rigid member similar to the lower control arms 232, 432 (FIGS. 2-4) with an outboard end 538 attached to the wheel knuckle 528 and an inboard end 540 attached to the frame 512. The upper control arm 534 is a rigid member similar to the upper control arms 234, 434 (FIGS. 2-4) with an outboard end 544 attached to the wheel knuckle 528 and an inboard end 546 attached to the frame 512. Similar to the lower and upper control arms 232, 234, 432, 434 (FIGS. 2-4), the lower and upper control arms 532, 534 are attached to the knuckle 528 and the frame 512 in a manner that permits the knuckle 528 to move generally up and down relative to the frame 512 and can allow steering of the wheel 514 if the wheel 514 is a steerable wheel.

The driveline 518 includes an electric motor 550, an inboard axle member 552, an outboard axle member 554, a first CV joint 556, a second CV joint 558, and a wheel hub (not shown) that can be similar to the drivelines 218, 418 (FIGS. 2-4) except as otherwise shown or described herein. Additionally, the driveline 518 includes a motor bracket 574. Similar to the motor 250 (FIGS. 2 and 3), the electric motor 550 includes a housing 564, a stator (not shown), a rotor (not shown), and an output shaft 570. The motor bracket 574 couples the housing 564 to the lower and upper control arms 532, 534 for movement relative to the frame 512.

In the example provided, the bracket 574 is a generally rigid body fixedly coupled to the housing 564. A first arm 586 of the bracket 574 extends radially outward from the housing 564 and is attached to the lower control arm 532. A second arm 590 of the bracket 574 extends radially outward from the housing 564 and is attached to the upper control arm 534. In the example provided, the first arm 586 is mounted to the lower control arm 532 at a location along the lower control arm 532 that is closer to the inboard end 540 than the outboard end 538 and the second arm 590 is mounted to the upper control arm 534 at a location along the upper control arm 534 that is closer to the inboard end 546 than the outboard end 544. Thus, the majority of the weight of the motor 550 is considered sprung mass. The first and second arms 586, 590 of the bracket 574 can be attached to the lower and upper control arms 532, 534 in a manner that permits movement of the bracket 574 relative to the lower and upper control arms 532, 534, such as pivot joints, ball joints, or compliant bushings.

Figure 6:
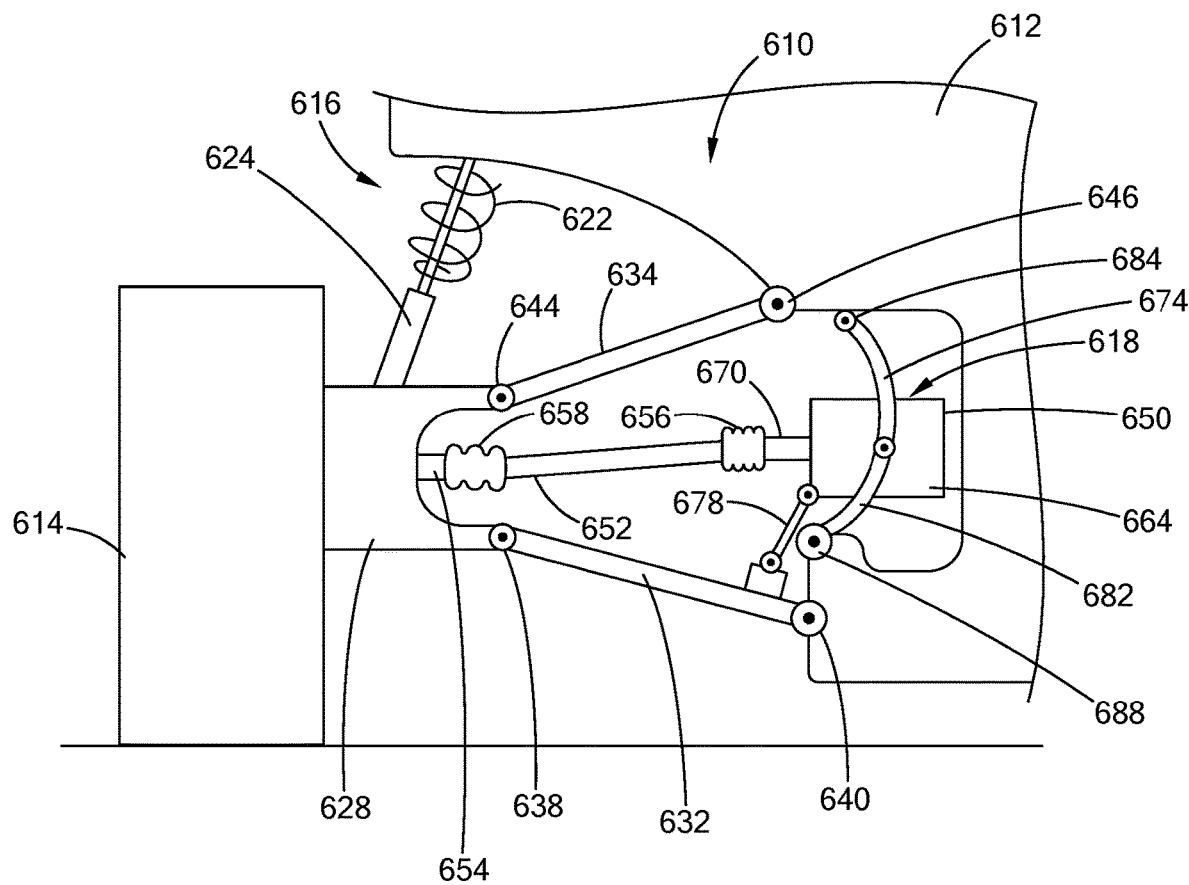
FIG. 6 is front view of a portion of a vehicle in accordance with the teachings of the present disclosure, illustrating a driveline of a fourth configuration.

With additional reference to FIG. 6, a portion of a vehicle 610 is illustrated including a vehicle frame 612, a vehicle drive wheel 614, a suspension system 616, and a driveline 618. The vehicle 610 can be configured similar to the vehicle 10 (FIG. 1), the vehicle 210 (FIGS. 2 and 3), the vehicle 410 (FIG. 4), and the vehicle 510 (FIG. 5), and the vehicle wheel 614 can correspond to the front wheels 18 (FIG. 1) and/or the rear wheels 22 (FIG. 1), while the driveline 618 corresponds to the associated driveline 30 (FIG. 1). While not specifically shown, the vehicle 610 can also include a steering system configured to steer the wheel 614, such as when drive wheel 614 corresponds to one of the front wheels 18 (FIG. 1) of the vehicle 10 (FIG. 1). The frame 612, drive wheel 614, suspension system 616, and driveline 618 can be similar to the frame 212, 412, 512, wheel 214, 414, 514, suspension system 216, 416, 516, and driveline 218, 418, 518 of FIGS. 2-5, except as otherwise shown or described herein. Accordingly, only differences are described in detail herein.

The suspension system 616 includes a spring 622, a damper 624, a wheel knuckle 628, a lower control arm 632 and an upper control arm 634, which can be similar to the suspension systems 216, 416, 516 (FIGS. 2-5) except as otherwise shown or described herein. While not specifically shown, the suspension system 616 can similarly include additional control arm members.

The lower control arm 632 is a rigid member similar to the lower control arms 232, 432, 532 (FIGS. 2-5) with an outboard end 638 attached to the wheel knuckle 628 and an inboard end 640 attached to the frame 612. The upper control arm 634 is a rigid member similar to the upper control arms 234, 434, 534 (FIGS. 2-5) with an outboard end 644 attached to the wheel knuckle 628 and an inboard end 646 attached to the frame 612. Similar to the lower and upper control arms 232, 234, 432, 434, 532, 534 (FIGS. 2-5), the lower and upper control arms 632, 634 are attached to the knuckle 628 and the frame 612 in a manner that permits the knuckle 628 to move generally up and down relative to the frame 612 and can allow steering of the wheel 614 if the wheel 614 is a steerable wheel.

The driveline 618 includes an electric motor 650, an inboard axle member 652, an outboard axle member 654, a first CV joint 656, a second CV joint 658, and a wheel hub (not shown) that can be similar to the drivelines 218, 418, 518 (FIGS. 2-5) except as otherwise shown or described herein. Additionally, the driveline 618 includes a motor bracket 674 and a positioning member 678. Similar to the motor 250 (FIGS. 2 and 3), the electric motor 650 includes a housing 664, a stator (not shown), a rotor (not shown), and an output shaft 670. The motor bracket 674 couples the housing 664 to the frame 612 for movement relative to the frame 612.

In the example provided, the bracket 674 includes a rigid mount member 682. The mount member 682 attaches the housing 664 to the frame 612 so that the weight of the motor 650 is supported entirely by the frame 612. Thus, the entire weight of the motor 650 is considered sprung mass. A first end 684 of the mount member 682 is coupled to the frame 612 at a first location on the frame 612 and a second end 688 of the mount member 682 is coupled to the frame 612 at a different location on the frame 612. The motor 650 is attached to the mount member 682 between the first and second ends 684, 688. The attachments between the mount member 682 and the frame 612 and the motor 650 are configured to permit the motor 650 to pivot relative to the frame 612, such as with pivot joints, ball joints, or compliant bushings.

The positioning member 678 couples the housing 664 to the lower control arm 632 in a manner that changes the angle of the motor output axis relative to the frame 612 based on the position of the lower control arm 632 relative to the frame 612. In the example provided, the positioning member 678 is a generally rigid body with one end mounted to the lower control arm 632 and the other end mounted to the housing 664. In an alternative configuration, not specifically shown, the positioning member 678 can have one end mounted to the upper control arm 634 and the other end mounted to the housing 664.

Accordingly, the drivelines of the present disclosure provide individual drive motors for each driven wheel while improving suspension travel without adding to the vehicle's unsprung weight.

The description of the disclosure is merely exemplary in nature and, thus, variations that do not depart from the substance of the disclosure are intended to be within the scope of the disclosure. Such variations are not to be regarded as a departure from the spirit and scope of the disclosure.

None of the elements recited in the claims are intended to be a means-plus-function element within the meaning of 35 U.S.C. § 112(f) unless an element is expressly recited using the phrase "means for", or in the case of a method claim using the phrases "operation for" or "step for".

What is claimed is:

1. A driveline for a vehicle comprising:
   a frame member;
   a knuckle;
   a control arm coupling the knuckle to the frame member;
   a hub coupled to the knuckle and adapted to support a drive wheel for rotation about a wheel axis relative to the knuckle;
   an electric motor including a rotor rotatable about a motor output axis, the motor being supported so that an orientation of the motor output axis relative to the knuckle and the frame member changes when an orientation of the control arm relative to the frame member changes, wherein the motor is mounted to the control arm at a location along the control arm that is between the knuckle and the frame member; and
   an axle member coupling the rotor to the hub for torque transmission therebetween.

2. The driveline of claim 1, further comprising a steering member, the steering member being coupled to the knuckle and configured to adjust a steering angle of the knuckle.

3. The driveline of claim 1, further comprising a first constant velocity joint coupling the axle member to the hub.

4. The driveline of claim 3, further comprising a second constant velocity joint coupling the axle member to the rotor of the motor.

5. The driveline of claim 1, further comprising a plurality of bushings that support the motor relative to the control arm and have compliance that permits articulation of the motor across an angular range relative to the frame member.

6. The driveline of claim 1, wherein the motor is mounted to the control arm at a location along the control arm that is closer to the frame member than the knuckle.

7. The driveline of claim 1, wherein the motor is mounted directly to the control arm.

8. The driveline of claim 1, wherein the motor is supported by the control arm.

9. The driveline of claim 8, wherein the motor is supported by the control arm such that an angle between the motor output axis and the control arm remains constant as the orientation of the control arm relative to the frame changes.

10. The driveline of claim 1, wherein the control arm is a lower control arm.

11. The driveline of claim 1, wherein the control arm is an upper control arm.

12. A driveline for a vehicle comprising:
    a frame member;
    a knuckle;
    a control arm coupling the knuckle to the frame member;
    a hub coupled to the knuckle and adapted to support a drive wheel for rotation about a wheel axis relative to the knuckle;
    an electric motor including a rotor rotatable about a motor output axis, the motor being mounted to the control arm and movable relative to the frame member between a first motor position wherein the motor output axis and the wheel axis form a first angle, and a second motor position wherein the motor output axis and the wheel axis form a second angle different than the first angle, wherein an angle between the motor output axis and the control arm is the same in the first motor position as in the second motor position; and
    an axle member coupling the rotor to the hub for torque transmission therebetween.

13. The driveline of claim 12, further comprising a plurality of bushings that support the motor relative to the control arm and have compliance that permits articulation of the motor across an angular range relative to the control arm.

14. The driveline of claim 12, wherein the motor is mounted to the control arm at a location along the control arm that is closer to the frame member than the knuckle.

15. The driveline of claim 12, further comprising a steering member, the steering member being coupled to the knuckle and configured to adjust a steering angle of the knuckle.

16. The driveline of claim 12, further comprising at least one constant velocity joint, the at least one constant velocity joint coupling the axle member to one of the hub and the rotor of the motor.

17. A driveline for a vehicle comprising:
    a knuckle configured to support a wheel hub for rotation relative to the knuckle;
    a control arm having a first end coupled to the knuckle and a second end configured to be coupled to a frame of the vehicle; and
    an electric motor configured to output torque about an output axis, the motor being attached to the control arm at a location along the control arm that is between the first and second ends.

18. The driveline of claim 17, wherein the first end of the control arm is coupled to the knuckle to permit the control arm to pivot relative to the knuckle, and wherein the motor is mounted to the control arm such that an angle between the output axis and the control arm remains constant while the control arm pivots relative to the knuckle.

19. The driveline of claim 17 further comprising a hub coupled to the knuckle and rotatable relative to the knuckle, wherein an output of the motor is drivingly coupled to the hub.

20. The driveline of claim 19 further comprising an inboard axle member and an outboard axle member, the outboard axle member being coupled to the hub for common rotation about a rotational axis of the hub, the inboard axle drivingly coupling the output of the motor to the outboard axle member.

* * * * *